United States Patent [19]

Ohmura et al.

[11] Patent Number: 4,928,659
[45] Date of Patent: May 29, 1990

[54] APPARATUS FOR SUPPLYING AIR-FUEL MIXTURE IN INTERNAL COMBUSTION ENGINE

[75] Inventors: Yukihiro Ohmura; Yoshiyuki Kobayashi; Keiji Hosoi; Kazuharu Shimoda, all of Shizuoka, Japan

[73] Assignee: Suzuki Jidosha Kogyo Kabushiki Kaisha, Shizuoka, Japan

[21] Appl. No.: 345,464

[22] Filed: Apr. 28, 1989

[30] Foreign Application Priority Data

Jul. 14, 1988 [JP] Japan ................................ 63-176139

[51] Int. Cl.⁵ ............................................. F02M 23/10
[52] U.S. Cl. ..................................................... 123/588
[58] Field of Search .................................. 123/585, 588

[56] References Cited

U.S. PATENT DOCUMENTS

| 4,321,900 | 3/1982 | Takeda | 123/585 |
| 4,335,693 | 6/1982 | Cowles | 123/585 |
| 4,724,818 | 2/1988 | Kobayashi | 123/588 |
| 4,825,829 | 3/1989 | Abe | 123/588 |

FOREIGN PATENT DOCUMENTS

| 00107054 | 8/1980 | Japan . |
| 00049545 | 3/1982 | Japan . |
| 00061476 | 4/1985 | Japan . |

*Primary Examiner*—Willis R. Wolfe
*Assistant Examiner*—M. Macy
*Attorney, Agent, or Firm*—Flynn, Thiel, Boutell & Tanis

[57] ABSTRACT

An apparatus for supplying an air-fuel mixture through a collecting passage of an intake manifold to a cylinder of an internal combustion engine. The flow of the air-fuel mixture from the intake passageway of a throttle body is discharged transversely into the collecting passageway so that the mixture strikes a region on a side surface of the collecting passageway. Also provided is an arrangement for supplying an auxiliary air stream into the collecting passageway from a location across the striking region from the engine cylinder, which arrangement directs the auxiliary air toward the center of the striking region.

3 Claims, 2 Drawing Sheets

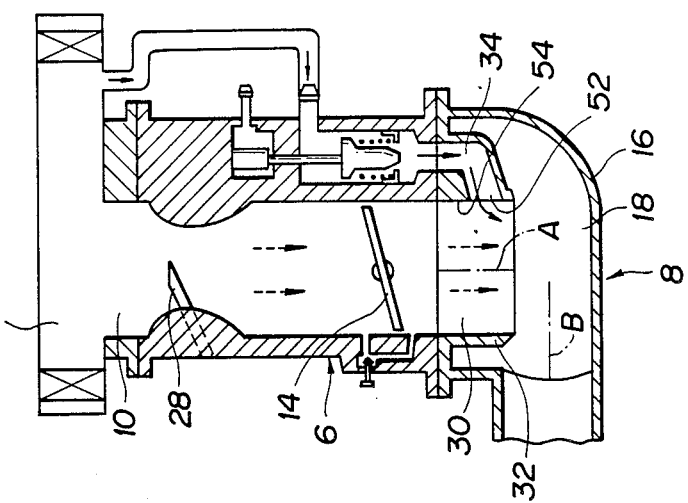
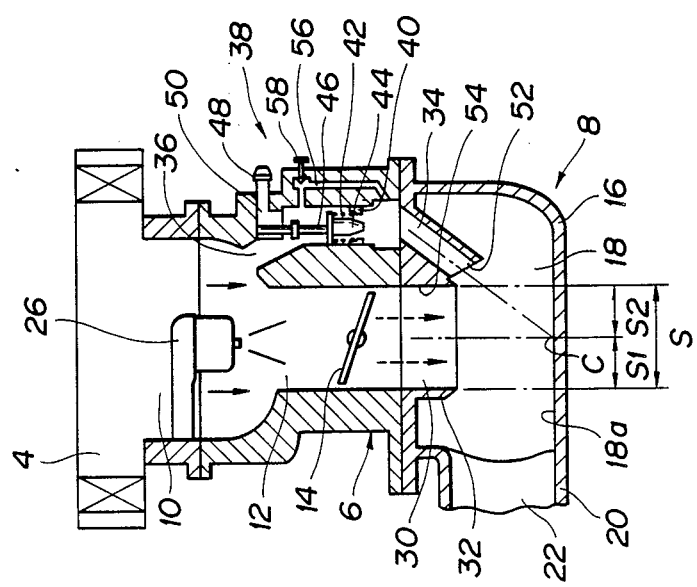

APPARATUS FOR SUPPLYING AIR-FUEL MIXTURE IN INTERNAL COMBUSTION ENGINE

FIELD OF THE INVENTION

The present invention relates to an apparatus for supplying an air-fuel mixture in an internal combustion engine and, more particularly, to an apparatus in which air and fuel can be actively mixed in a collecting passageway of an intake manifold, the fuel which was not mixed with the air can be actively fed in the downstream direction of the collecting passageway, the uniformly mixed air-fuel mixture can be preferably distributed to each cylinder of the internal combustion engine, and starting performance at low temperatures and idling stability can be improved.

BACKGROUND OF THE INVENTION

In a multi-cylinder type internal combustion engine, an apparatus for supplying an air-fuel mixture is provided to supply the air-fuel mixture to each cylinder. Such an air-fuel mixture supplying apparatus is known and is shown in FIG. 6. In FIG. 6, reference numeral 2 denotes an internal combustion engine; 4 indicates an air cleaner; 6 a throttle body; and 8 an intake manifold. Air which passes into an intake passageway 10 on the downstream side of the air cleaner 4 is mixed with fuel which is supplied from a fuel injection valve 26 and an air-fuel mixture is obtained. The flow rate of the air-fuel mixture is adjusted by a movable throttle valve 14 provided in a throttle body intake passageway 12, and thereafter the air-fuel mixture flows into a collecting passageway 18 of a collecting pipe 16 which is part of the intake manifold 8. The air-fuel mixture flowing through the collecting passageway 18 is respectively branched into a branch passageway 22 of a branch pipe 20 which is branched from the collecting pipe 16 for distribution into each cylinder 24 of the internal combustion engine 2.

However, in such an air-fuel mixture supplying apparatus, the air and the air-fuel mixture can not be properly mixed at low temperatures, particularly at super low temperatures, so there is a problem in that it is difficult to distribute and supply uniform fuel into each cylinder. Therefore, air-fuel mixture supplying apparatuses as disclosed in Japanese Patent Application Laid-Open No. 107054/1980, Japanese Utility Model Application Laid-Open Nos. 49545/1982 and 61476/1985, and the like have been proposed. Such an apparatus is also disclosed in Japanese Patent Application No. 46414/1988 as owned by the assignee of this invention. According to the above apparatuses, as shown in FIGS. 2-5, a pipe member 32 projects transversely into the collecting passageway 18 to create a partition or shroud. This pipe member 32 forms an installation passageway 30 whose inlet end communicates with the discharge end of the intake passageway 12 and whose outer end opens into the collecting passageway 18. This passageway 30 thus effectively acts as an extension of the passageway 12. An auxiliary air passageway 34 which bypasses the throttle valve 14 is provided for introducing auxiliary air downstream of the throttle valve.

More specifically, according to the apparatus disclosed in Japanese Patent Application Laid-Open No. 107054/1980, as shown in FIG. 3, an auxiliary air outlet 52 at the downstream end of the auxiliary air passageway 34 is annularly formed around the whole periphery of the discharge end opening of the passageway 30 so that air and fuel are mixed in the collecting passageway 18. On the other hand, according to the apparatus disclosed in Japanese Utility Model Application Laid-Open No. 49545/1982, as shown in FIG. 4, a plurality of auxiliary air outlets 52 are associated with the auxiliary air passageway 34 and are formed circumferentially around the passageway 30 radially through the wall surface 54 of the pipe member 32, thereby preventing fuel from being deposited onto the wall surface 54. Further, according to the apparatus disclosed in Japanese Utility Model Application Laid-Open No. 61476/1985, as shown in FIG. 5, the auxiliary air outlet 52 of the auxiliary air passageway 34 is formed in the wall of the collecting passageway 18 outside the base end portion of the pipe member 32, thereby preventing choking of the auxiliary air outlet 52.

Further, according to the apparatus of Japanese Patent Application No. 46414/1988, as shown in FIG. 2, the auxiliary air outlet 52 of the auxiliary air passageway 34 is formed in the wall surface 54 near the end opening of the passageway 30 in a manner such that the end port of passageway 34 opens directly through the open lower end of passageway 30. The outlet 52 is directed so as to have a first directional component along the axial centerline direction A in the downstream direction of the passageway 30 and a second directional component along the axial centerline direction B in the downstream direction of the passageway 18. The air and the fuel are mixed in the passageway 30. Reference numeral 28 denotes a nozzle as a fuel supplying mechanism.

However, according to the apparatus disclosed in Japanese patent Application Laid-Open No. 107054/1980 (FIG. 3), since the auxiliary air outlet 52 is annularly formed around the whole periphery of the end opening of the passageway 30, the auxiliary air is introduced in parallel with the air-fuel mixture flowing into the collecting passageway 18. On the other hand, according to the apparatus disclosed in Japanese Utility Model Application Laid-Open No. 49545/1982 (FIG. 4), since the auxiliary air outlets 52 are formed circumferentially of the passageway 30 through the wall surface 54, the auxiliary air is introduced substantially in parallel with the air-fuel mixture along the wall surface 54 of the passageway 30. Further, according to the apparatus disclosed in Japanese Utility Application Laid-Open No. 61476/1985 (FIG. 5), since the auxiliary air outlet 52 is formed in the wall of passageway 18 outside the base end portion of the pipe member 32, the auxiliary air is introduced into the collecting passageway 18 separately from the air-fuel mixture. Further, according to the apparatus of Japanese Patent Application No. 46414/1988 (FIG. 2), the air discharged from the auxiliary air passage 34 is not effectively mixed with the air-fuel mixture in the passageway 30 but rather is directly introduced into the collecting passage 18, whereupon some of this unmixed air is directly introduced into one or more of the branch passageways 22 so that the air-fuel mixture in the respective cylinder becomes lean.

As mentioned above, according to the above apparatuses, the air and the fuel are not actively mixed in the passageway 30 and a thoroughly mixed air-fuel mixture is not actively supplied to the downstream side of the collecting passageway 18. Therefore, a uniformly mixed air-fuel mixture can not be distributed to each cylinder of the internal combustion engine, and there thus is an inconvenience in that the starting performance at low temperatures, particularly at super low temperatures, is lost. Another undesirable occurrence is that fuel which is not properly mixed with air collects on the bottom surface of the collecting passageway 18, so that stability in idling is lost.

Therefore, the objects of the present invention include providing an apparatus for supplying an air-fuel mixture in an internal combustion engine in which air and fuel can be actively mixed in a collecting passageway of an intake manifold collecting pipe, in which any fuel which is not properly mixed with air can be actively fed in the downstream direction of the collecting passageway, in which the uniformly mixed air-fuel mixture can preferably be distributed to each cylinder of the internal combustion engine, and in which starting performance at low temperatures and idling stability can be improved.

SUMMARY OF THE INVENTION

To accomplish the above objects and others, the present invention includes an intake manifold member provided with a collecting passageway therein which communicates with an intake passageway of a throttle body of an internal combustion engine. A pipe member is provided on the throttle body so as to extend the downstream end of the intake passageway. The pipe member projects transversely into the collecting passageway to form a skirtlike partition whose discharge end opens into the collecting passageway. An auxiliary air passageway bypasses the throttle valve of the throttle body but passes through the inside of the throttle body. The auxiliary air passageway is provided with a discharge end port which is directed toward a side wall region of the collecting passageway which is on a side which is opposite the internal combustion engine, which side wall region is also directly opposite the discharge end port defined by the extension of the intake passageway. The air-fuel mixture from the intake passageway and the auxiliary air thus collide and mix at this side wall region.

According to the construction of the invention, the outlet of the auxiliary air passageway is formed so that the discharged stream of auxiliary air is discharged into the collecting passageway from a side of the intake passageway which is opposite the internal combustion engine, and is discharged toward the center of the side wall region of the collecting passageway where the air-fuel mixture flowing from the intake passageway collides. Thus, the air and the fuel can be actively mixed in the collecting passageway. Any fuel which is not mixed with the air can be actively fed in the downstream direction of the collecting passageway.

BRIEF DESCRIPTION OF THE DRAWINGS

FIG. 1 is a cross-sectional view of an apparatus for supplying an air-fuel mixture according to the present invention.

FIGS. 2 to 6 are cross-sectional views of examples of other apparatuses for supplying an air-fuel mixture.

DETAILED DESCRIPTION

An embodiment of the present invention will now be described in detail on the basis of the drawings.

Figure 3:
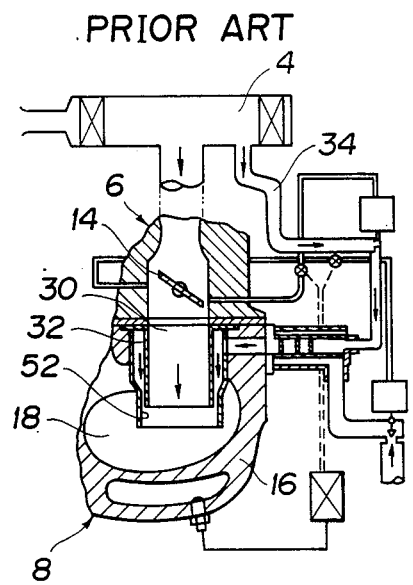
Figure 4:
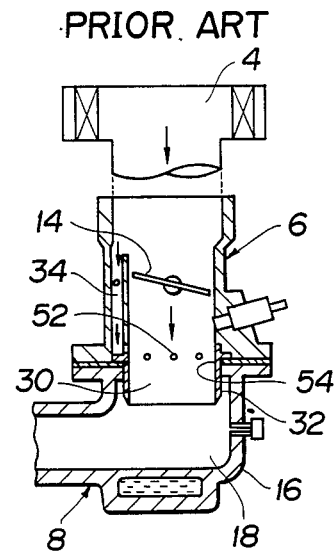
Figure 5:
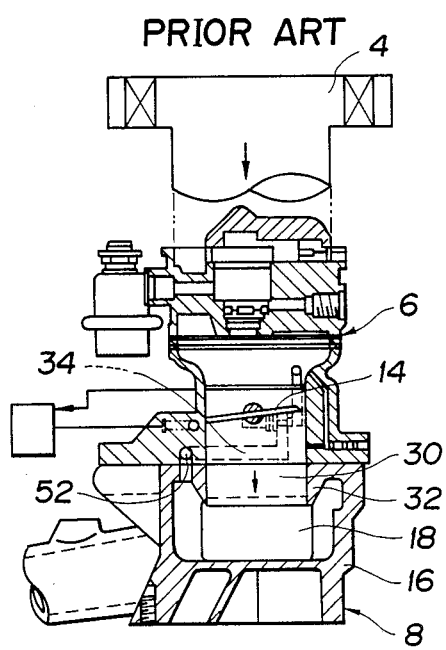
Figure 6:
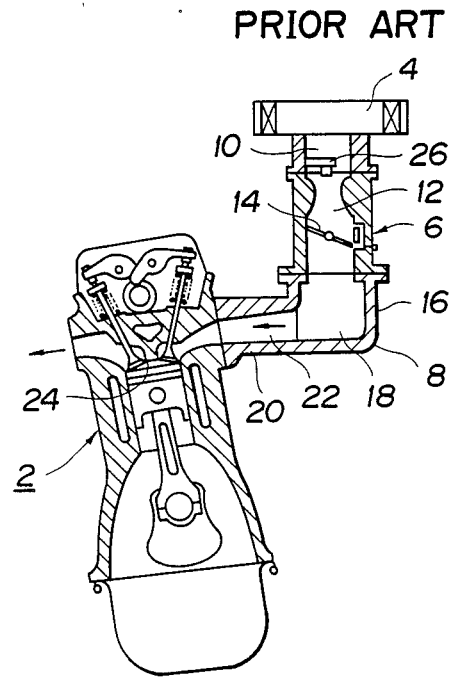

FIG. 1 shows an embodiment of the invention. In this embodiment, the portions having the same functions as those in the examples shown in FIGS. 2 to 6 are designated by the same reference numerals.

Considering now the present invention, an apparatus for supplying an air-fuel mixture is constructed as shown in FIG. 1. More specifically, the fuel injection valve 26 is provided as a fuel supplying mechanism in the throttle body intake passageway 12 of the throttle body 6 of the internal combustion engine 2. The air drawn into the intake passageway 10 on the downstream side of the air cleaner 4 is mixed with the fuel which is supplied from the fuel injection valve 26, so that an air-fuel mixture is obtained.

The pipe member 32 is coaxially secured to the discharge end of the body 6 and projects into the collecting passageway 18 where it functions as a sleevelike shroud or partition to form the extension passageway 30 whose lower outlet end port opens into the collecting passageway 18 of the collecting pipe 16 of the intake manifold 8. The upper or inlet end of extension passageway 30 communicates with the discharge end of the intake passageway 12 which is provided in the throttle body 6. The lower end portion of the pipe member 32 is formed like a sharp edge, thereby enabling any liquid fuel which flows down along the wall surface 54 of the passageway 30 to drop off.

There is provided the auxiliary air passageway 34 which bypasses the throttle valve 14 of the throttle body 6 by passing through the inside of the throttle body 6. An auxiliary air inlet 36 for taking in the auxiliary air is provided so that the inlet port is opened into the intake passageway 12 on the upstream side of the throttle valve 14.

An auxiliary air control arrangement 38 for opening or closing the auxiliary air passageway 34 in accordance with the temperature of the internal combustion engine 2 is provided in the auxiliary air passageway 34. The auxiliary air control arrangement 38 has a valve seat 40 provided in the auxiliary air passageway 34, a valve member 44 which is arranged so as to face the valve seat 40, a spring 42 which urges the valve member 44 away from the valve seat 40, a movable rod 46 on one end of which is fixed the valve member 44, and a thermowax 50 serving as a temperature sensitive displacement material which is provided at the other end of the rod 46 and is expanded or contracted in accordance with the temperature of the engine cooling water supplied from a water intake port 48 to represent the temperature of the internal combustion engine 2. Expansion and contraction of the thermowax 50 causes the rod 46 to move respectively toward and away from the valve seat 40. Thus, the auxiliary air control arrangement 38 allows the valve member 44 to contact or remain spaced from the valve seat 40 in accordance with the temperature of the cooling water in the internal combustion engine 2, thereby closing or opening the auxiliary air passageway 34 and controlling the auxiliary air amount.

The air-fuel mixture flowing out through the extension passageway 30 collides with the side (i.e. bottom) surface 18a of the collecting passageway 18 over an area or region S thereof. The auxiliary air which is taken in from the auxiliary air inlet 36 and is controlled by the auxiliary air control arrangement 38 is discharged from the auxiliary air outlet 52 into the collection passageway 18. The auxiliary air outlet 52 is provided above and horizontally adjacent the edge of a side region $S_2$ on the side of the region S which is opposite the internal combustion engine 2 instead of adjacent the side region $S_1$ which is on the same side of the region S (that is, the cylinder 24 thereof) as the internal combustion engine 2. In this embodiment, the outlet 52 is directed so that the centerline of the discharged stream of auxiliary air substantially intersects the center C of the region S, which center C is also on the centerline of passageway 30.

In other words, the air outlet 52 is directed so as to supply air toward the center C of the region S from a location in the collecting passageway 18 spaced above the surface 18a and on the opposite side of the side region $S_2$ from the cylinder 24.

Reference numeral 56 denotes an idling adjusting passageway and 58 indicates an idling adjusting screw.

The operation according to the foregoing construction will be described.

At low temperatures of the internal combustion engine 2, the auxiliary air control arrangement 38 keeps the valve member 44 spaced from the valve seat 40 by the contraction of the thermowax 50, thereby opening the auxiliary air passageway 34. Thus, a large amount of auxiliary air can flow through the auxiliary air passageway 34. When the internal combustion engine 2 is actuated in such a state, the auxiliary air is introduced through the auxiliary air outlet 52 into the collecting passageway 18. The auxiliary air outlet 52 is provided so that its end port is opened and directed toward the collision center C, and so as to be directed from the side of the side region $S_2$ which is opposite the internal combustion engine 2. The collision center C is located at the center of the region S on the bottom surface 18a of the collecting passageway 18 where the air-fuel mixture flowing through the extension passageway 30 collides with the side surface of the collecting passageway 18.

Therefore, in the collecting passageway 18, the air and the fuel can be actively and uniformly mixed by the auxiliary air which is discharged from the auxiliary air outlet 52 and is directed toward the collision center C on the bottom surface 18a of the collecting passageway 18. At this time, since the lower edge portion of the pipe member 32 is formed like a sharp edge, any liquid fuel flowing downwardly along the wall surface 54 of the passageway 30 is sharply cut and transformed into a sprayed state within the collecting passageway 18, thereby promoting the uniform mixture. Also, the uniformly mixed air-fuel mixture can be actively fed downstream of the collecting passageway 18 by the auxiliary air and can be supplied into each cylinder 24.

As mentioned above, since the uniformly mixed air-fuel mixture can be preferably distributed into each cylinder 24 of the internal combustion engine 2, the starting performance of the internal combustion engine 2, particularly at extremely low temperatures, can be improved. Also, the fuel which was not mixed with the air can be actively fed in the downstream direction of the collecting passageway 18, so that it is possible to prevent fuel which was not mixed with the air from remaining on the bottom surface 18a of the collecting passageway 18. Therefore, idling stability can be improved. Further, since there is no need to add or extend auxiliary equipment such as a throttle opener or the like to improve the starting performance, the cost can be reduced and durability can be improved.

After completion of the actuation of the internal combustion engine 2, when the temperature of the cooling water rises due to the continuation of the warming-up operation, the auxiliary air control arrangement 38 causes the valve member 44 to approach the valve seat 40 by the expansion of the thermowax 50, thereby gradually closing the auxiliary air passageway 34. Thus, the auxiliary air passing through the auxiliary air passageway 34 is gradually decreased. Therefore, since the amount of auxiliary air which is introduced from the auxiliary air outlet 52 to the collecting passageway 18 is gradually reduced, the operating performance of the engine in the warming-up operation can be maintained.

As described above, according to the invention, the auxiliary air outlet of the auxiliary air passageway is provided so that its end port is opened so as to be directed to the center of the region S where the air-fuel mixture flowing through the extension passageway strikes the bottom surface of the collecting passageway, and so as to be directed from the side of the side region $S_2$ which is opposite the internal combustion engine. Therefore, in the collecting passageway, the air and the fuel can be actively mixed and the fuel which was not mixed with the air can be actively fed in the downstream direction of the collecting passageway.

The structure and operation of the arrangement of the present invention, as illustrated by FIG. 1, will now be briefly summarized: The pipe member 32 defines therein the passageway 30 which in effect constitutes a downward extension of the intake passageway 12, which pipe member 32 and its extension passageway 30 hence project transversely downwardly into the interior of the collecting passageway 18. This intake passageway 12 and its extension 30 discharges downwardly therefrom a stream of fuel-air mixture, which stream is discharged generally along the centerline of the passageways 12 and 30 in a direction which is substantially transverse (and normally perpendicular) to the opposed side or bottom surface 18a of the collecting manifold pipe 16. This discharged stream of air-fuel mixture thus effectively strikes the surface 18a within the region S. In addition, the auxiliary air passageway 34 is capable of discharging from its outlet 52 a stream of auxiliary air. This stream of auxiliary air is discharged directly the collecting passageway 18 along the centerline of passage 34, which centerline when extended effectively intersects the region S at the center C. Thus, the auxiliary air and fuel-air streams both effectively impact at the region S to facilitate mixing. In addition, the outlet port 52 for the auxiliary air stream is disposed closely adjacent but located exteriorly on one side of the discharge outlet of the passageway 30. In fact, the auxiliary air outlet 52 is located on the diametrically opposite side of the passageway 30 from the location of the cylinder 24. In this manner, the discharged auxiliary air stream hence has a velocity component which extends horizontally across the bottom of the passageway 30 in a direction toward the cylinder.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus for supplying an air-fuel mixture in an internal combustion engine, comprising:
a pipe member provided in a collecting passageway of an intake manifold collecting pipe, said pipe member being provided so as to form an extension passageway having a discharge end port opening into said collecting passageway, said extension passageway having an inlet end port which communicates with a discharge end opening of an intake passageway formed in a throttle body of an internal combustion engine; and an auxiliary air passageway formed in said pipe member which bypasses a throttle valve of the throttle body by passing through the inside of said pipe member, said auxiliary air passageway terminating in an auxiliary air outlet, said auxiliary air outlet being disposed on an opposite side of said extension passageway from the engine cylinder and said auxiliary air outlet being oriented so as to discharge a stream of auxiliary air toward a center of collision located substantially at the center of a region of a side surface of the collecting passageway where the air-fuel mixture flowing through the extension passageway collides with said side surface.

2. An apparatus for supplying an air-fuel mixture to cylinders of an internal combustion engine, comprising:

an intake manifold defining therein a collecting passageway and a plurality of branch passageways extending from said collecting passageway to the individual cylinders;

a device for supplying a stream of a air-fuel mixture into said collecting passageway, said device including a throttle body having an intake passageway extending therethrough, a throttle movably associated with the intake passageway, and means for supplying fuel to the intake passageway, said intake passageway extending in generally transverse relation to said collecting passageway;

a tubular member secured to said tubular body and defining therein a passageway which is aligned with and constitutes an extension of said intake passageway at the downstream end thereof, said tubular member projecting transversely into said collecting passageway and at its downstream end defining a discharge opening which is positioned within the interior of said collecting passageway and is disposed in sidewardly spaced relationship from an opposed side wall of the collecting passageway so that the stream of air-fuel mixture discharged through the outlet opening will directly strike a region on said opposed side wall; and means defining an auxiliary air passageway which bypasses said throttle for supplying a stream of auxiliary air directly into said collecting passageway at a location closely adjacent said discharge opening, said auxiliary air passageway terminating in an auxiliary air outlet which is positioned exteriorly of but closely adjacent one diametrical side of said discharge opening, said auxiliary air passageway and said auxiliary air outlet being oriented so that the stream of auxiliary air is discharged along a centerline which extends across the collecting passageway and impacts substantially at the center of said region; and said auxiliary air outlet and said cylinder being disposed on substantially opposite sides of said discharge opening.

3. An apparatus according to claim 2, wherein said tubular member terminates in a sharp end at the downstream end thereof so that any liquid fuel droplets which collect at said sharp edge can be readily removed and sprayed through the collecting passageway due to the flow of auxiliary air across said edge.

* * * * *